(12) United States Patent
     Kadaba et al.

(10) Patent No.: US 9,950,862 B2
(45) Date of Patent: Apr. 24, 2018

(54) AUTOMATED LOADING AND UNLOADING ITEMS

(71) Applicant: United Parcel Service of America, Inc., Atlanta, GA (US)

(72) Inventors: Nagesh Kadaba, Roswell, GA (US); Erik Peterson, Marietta, GA (US); Thomas Ramsager, Roswell, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 15/393,813

(22) Filed: Dec. 29, 2016

(65) Prior Publication Data

US 2017/0107056 A1    Apr. 20, 2017

Related U.S. Application Data

(63) Continuation of application No. 14/608,869, filed on Jan. 29, 2015, now Pat. No. 9,598,238, which is a
(Continued)

(51) Int. Cl.
     *B60P 1/54*      (2006.01)
     *B65G 1/137*     (2006.01)
     (Continued)

(52) U.S. Cl.
     CPC ............ *B65G 1/137* (2013.01); *B25J 9/1694* (2013.01); *B60P 1/4414* (2013.01); *B60P 1/52* (2013.01); *B60P 1/5438* (2013.01); *B60P 3/007* (2013.01); *B65G 1/16* (2013.01); *B65G 47/02* (2013.01); *B65G 67/04* (2013.01); *B65G 67/24* (2013.01);
     (Continued)

(58) Field of Classification Search
     CPC .......... B65G 1/137; B65G 1/16; B60P 1/5438
     See application file for complete search history.

(56) References Cited

U.S. PATENT DOCUMENTS

| 4,812,985 A | 3/1989 | Hambrick et al. |
| 5,468,110 A | 11/1995 | McDonald et al. |
| (Continued) | | |

OTHER PUBLICATIONS

Aized, Tauseef, "Materials handling in flexible manufacturing systems", *Future Manufacturing Systems*, Aug. 17, 2010, pp. 121-136, retrieved from the Internet: URL:http://cdn.intechweb.org/pdfs/11321.pdf on Feb. 18, 2016.
(Continued)

*Primary Examiner* — Thomas Randazzo
(74) *Attorney, Agent, or Firm* — Shook, Hardy & Bacon L.L.P.

(57) ABSTRACT

Computer program products, methods, systems, apparatus, and computing entities are provided for automated loading and retrieval of items. In various embodiments, items are received at a loading station where identification data may be captured for each item and handling instructions may be generated. In some embodiments, a label having indicia associated with the item may be generated and affixed to the item. The items may then be deposited through an access door into the vehicle identified in the handling instructions. Once the items are loaded into the access door, an automated load/unload device may deposit the item in the appropriate storage location. The automated load/unload device may also retrieve and rearrange items as desired.

20 Claims, 11 Drawing Sheets

Related U.S. Application Data continuation of application No. 14/608,758, filed on Jan. 29, 2015.

(51) Int. Cl.

| | | |
|---|---|---|
| *B65G 1/16* | (2006.01) | |
| *B65G 47/02* | (2006.01) | |
| *B25J 9/16* | (2006.01) | |
| *G06Q 50/28* | (2012.01) | |
| *B60P 1/44* | (2006.01) | |
| *B60P 1/52* | (2006.01) | |
| *B60P 3/00* | (2006.01) | |
| *G06Q 10/08* | (2012.01) | |
| *B65G 67/04* | (2006.01) | |
| *B65G 67/24* | (2006.01) | |
| *G05B 19/19* | (2006.01) | |
| *G07C 5/00* | (2006.01) | |
| *G08G 1/00* | (2006.01) | |

(52) U.S. Cl.
CPC ........... *G05B 19/19* (2013.01); *G06Q 10/083* (2013.01); *G06Q 10/0833* (2013.01); *G06Q 50/28* (2013.01); *G07C 5/00* (2013.01); *G07C 5/008* (2013.01); *G08G 1/20* (2013.01); *G08G 1/202* (2013.01); *G08G 1/205* (2013.01); *B65G 2201/025* (2013.01); *B65G 2814/0302* (2013.01); *G05B 2219/32392* (2013.01)

(56) References Cited

U.S. PATENT DOCUMENTS

| | | | |
|---|---|---|---|
| 5,893,697 A | 4/1999 | Zini et al. | |
| 6,873,881 B1 | 3/2005 | Schneible, Sr. | |
| 6,959,804 B2 | 11/2005 | Helgerson et al. | |
| 7,194,331 B2* | 3/2007 | Perez | B07C 3/14 |
| | | | 235/375 |
| 7,299,125 B2 | 11/2007 | Marks et al. | |
| 7,624,024 B2 | 11/2009 | Levis et al. | |
| 7,657,467 B2 | 2/2010 | Deganis et al. | |
| 7,839,289 B2 | 11/2010 | Chung et al. | |
| 8,140,180 B2 | 3/2012 | Knipfer et al. | |
| 8,175,925 B1 | 5/2012 | Rouaix | |
| 8,279,067 B2 | 10/2012 | Berger et al. | |
| 8,398,357 B2* | 3/2013 | Alexander | B60P 1/5409 |
| | | | 212/180 |
| 8,416,067 B2* | 4/2013 | Davidson | G06Q 10/08 |
| | | | 340/426.1 |
| 8,561,897 B2 | 10/2013 | Kunzig et al. | |
| 8,651,794 B2 | 2/2014 | Pippin | |
| 9,008,829 B2 | 4/2015 | Worsley | |
| 9,127,945 B2 | 9/2015 | Telang et al. | |
| 9,434,558 B2* | 9/2016 | Criswell | B25J 5/007 |
| 2002/0123918 A1 | 9/2002 | Brown et al. | |
| 2006/0149413 A1 | 7/2006 | Perez et al. | |
| 2006/0206235 A1 | 9/2006 | Shakes et al. | |
| 2008/0040911 A1* | 2/2008 | De Koning | G05B 19/41825 |
| | | | 483/1 |
| 2009/0146832 A1 | 6/2009 | Ebert et al. | |
| 2010/0094769 A1* | 4/2010 | Davidson | G06Q 10/06 |
| | | | 705/338 |
| 2012/0030133 A1* | 2/2012 | Rademaker | G06Q 10/08 |
| | | | 705/333 |
| 2012/0253548 A1* | 10/2012 | Davidson | G06Q 10/08 |
| | | | 701/1 |
| 2012/0253888 A1* | 10/2012 | Davidson | G06Q 10/08 |
| | | | 705/7.38 |
| 2013/0063251 A1 | 3/2013 | Allen | |
| 2013/0124430 A1 | 5/2013 | Moir et al. | |
| 2015/0154559 A1 | 6/2015 | Barbush et al. | |
| 2015/0210199 A1 | 7/2015 | Payne | |
| 2015/0352721 A1* | 12/2015 | Wicks | B25J 9/1664 |
| | | | 700/228 |
| 2016/0090248 A1 | 3/2016 | Worsley et al. | |
| 2016/0221768 A1 | 8/2016 | Kadaba et al. | |
| 2016/0224930 A1 | 8/2016 | Kadaba et al. | |

OTHER PUBLICATIONS

International Searching Authority, International Search Report and Written Opinion for International Application No. PCT/US2015/060907, dated Mar. 2, 2016, 16 pages, European Patent Office, The Netherlands.

Kay, Michael G., "Material Handling Equipment", Jan. 12, 2012, 66 pages, Retrieved from the Internet: URL:http://www.ise.ncsu.edu/kay/Material_Handling_Equipment.pdf retrieved on Feb. 11, 2016.

Rogers, Lorie King, "Automatic Guided Vehicles", *Modern Materials Handling*, Sep. 1, 2010, pp. 36-39, retrieved from the Internet: URL:http://www.mmh.com/images/site/MMH1109EquipReport_AGVs.pdf on Feb. 18, 2016.

United States Patent and Trademark Office, Office Action for U.S. Appl. No. 14/608,869, dated Feb. 9, 2016, 15 pages, U.S.A.

United States Patent and Trademark Office, Office Action for U.S. Appl. No. 14/608,869, dated Jul. 21, 2016, 20 pages, U.S.A.

United States Patent and Trademark Office, Notice of Allowance for U.S. Appl. No. 14/608,869, dated Nov. 4, 2016, 10 pages, U.S.A.

Non-Final Rejection dated Aug. 3, 2017 for U.S. Appl. No. 14/608,758.

Maloney, David. Fedex hits the ground running. Jul. 2001. Peerless Media, LLC. Modern Materials Handling, vol. 56, Issue 8. p. 31. (Year: 2001).

Final Rejection dated Jan. 8, 2018 for U.S. Appl. No. 14/608,758.

\* cited by examiner

AUTOMATED LOADING AND UNLOADING ITEMS

CROSS REFERENCE TO RELATED APPLICATIONS

This patent application is a continuation of U.S. patent application Ser. No. 14/608,869 filed on Jan. 29, 2015, which is a continuation of U.S. patent application Ser. No. 14/608,758, filed Jan. 29, 2015, each of which are incorporated herein by reference in their entirety.

BACKGROUND

The need to improve efficiency is an omnipresent goal within the package delivery industry. Package volume grows each year, along with customer requirements for greater package tracking and faster delivery. This presents an ongoing challenge to shippers throughout the country, who continuously work to streamline all stages of the package transportation process, from sortation and loading, to routing and delivery.

Carriers typically maintain delivery data for each of the shipments that are forecasted to be delivered by a delivery network. This dynamic data may include a ship date, an origin address, destination address, service level, a forecasted delivery date, a unique identifier (e.g., a tracking number), and exception information. As a package moves through the delivery network, the unique identifier is captured and location information related to the shipment is updated in the associated delivery data record. This delivery record may be accessed using the unique identifier to review the data.

In general, carriers generate a dispatch plan which is the schedule or route through which a carrier assigns work to carrier service providers (such as delivery vehicle drivers) to coordinate and schedule the pickup and delivery of packages. Dispatch plans are well known in the carrier industry and are used daily by commercial carriers to manage driver delivery routes. Once assigned to a vehicle, the packages are routed through the carrier's destination facility to the appropriate vehicle to be loaded thereon.

Typically, a carrier destination facility has a plurality of package cars that are being loaded simultaneously and each package car has a variety of potential storage locations. Loading personnel have the responsibility of ensuring that the packages are loaded in the correct position within a vehicle. An unsatisfied need exists in the industry for improved systems and methods for loading packages.

SUMMARY

Embodiments of the present invention provides systems, methods, and apparatuses for automated loading and unloading of items in delivery vehicles. In one aspect of the invention, a method of loading items into a vehicle is provided. The method includes the steps of: capturing shipping indicia associated with an item, wherein the shipping data includes a destination address or a unique identifier; determining a storage location within the vehicle for the item; disposing the item into the vehicle via an access port; and activating a load/unload device to move the item to the storage location within the vehicle.

In another aspect of the invention, a system for loading an item is provided. The system includes a vehicle having a cargo area with an access port, and a plurality of storage locations, wherein at least some of the storage locations have restrictions relating to the items that can be stored therein; a load/unload device configured to transport an item from the access port to one of the plurality of storage locations; and a controller disposed within the vehicle and comprising at least one processor and at least one memory having program code instructions embodied therein. The memory and program code instructions are configured to, with the at least one processor, cause the controller to: determine a storage location for the item; and provide instructions to the load/unload device indicating the storage for the item.

BRIEF DESCRIPTION OF THE DRAWINGS

Figure 1:
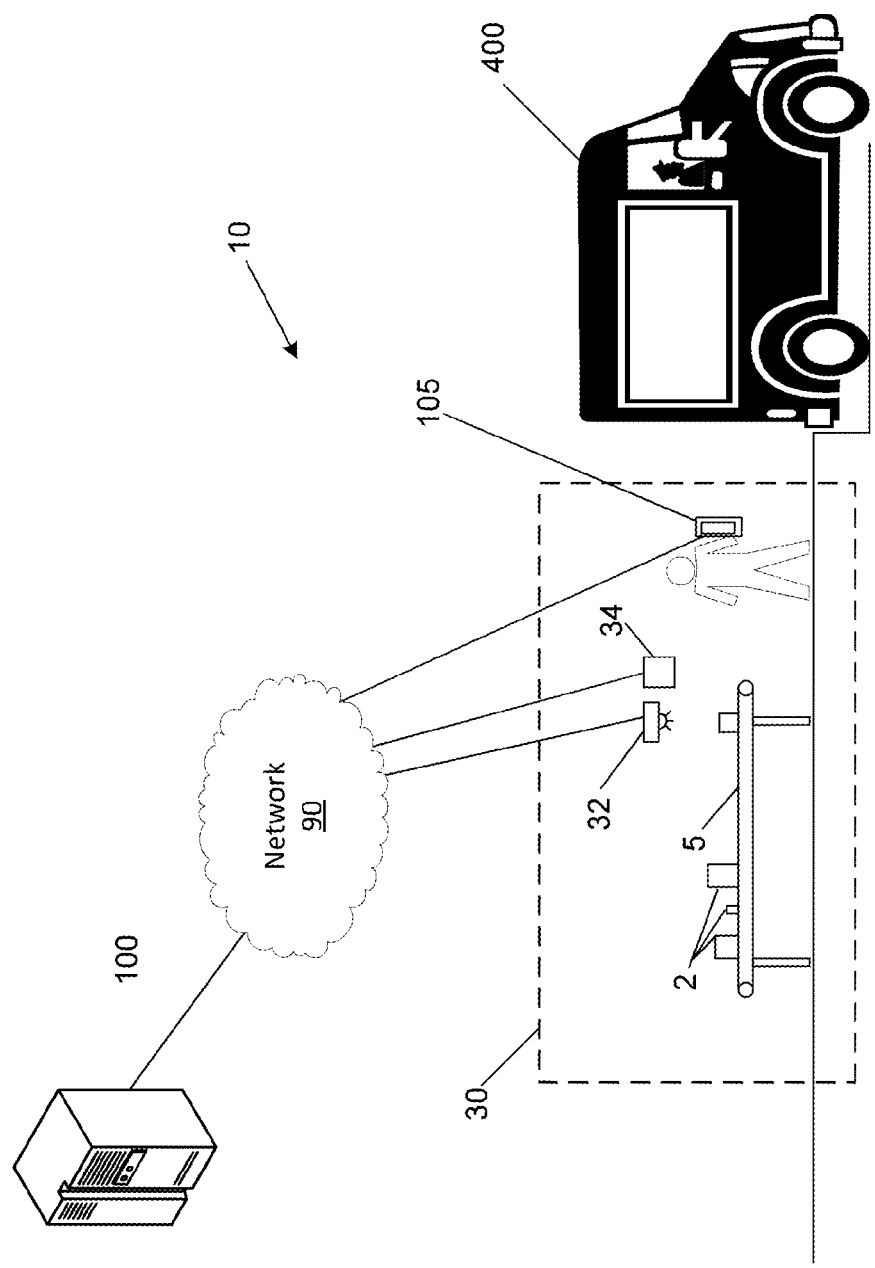
Figure 2:
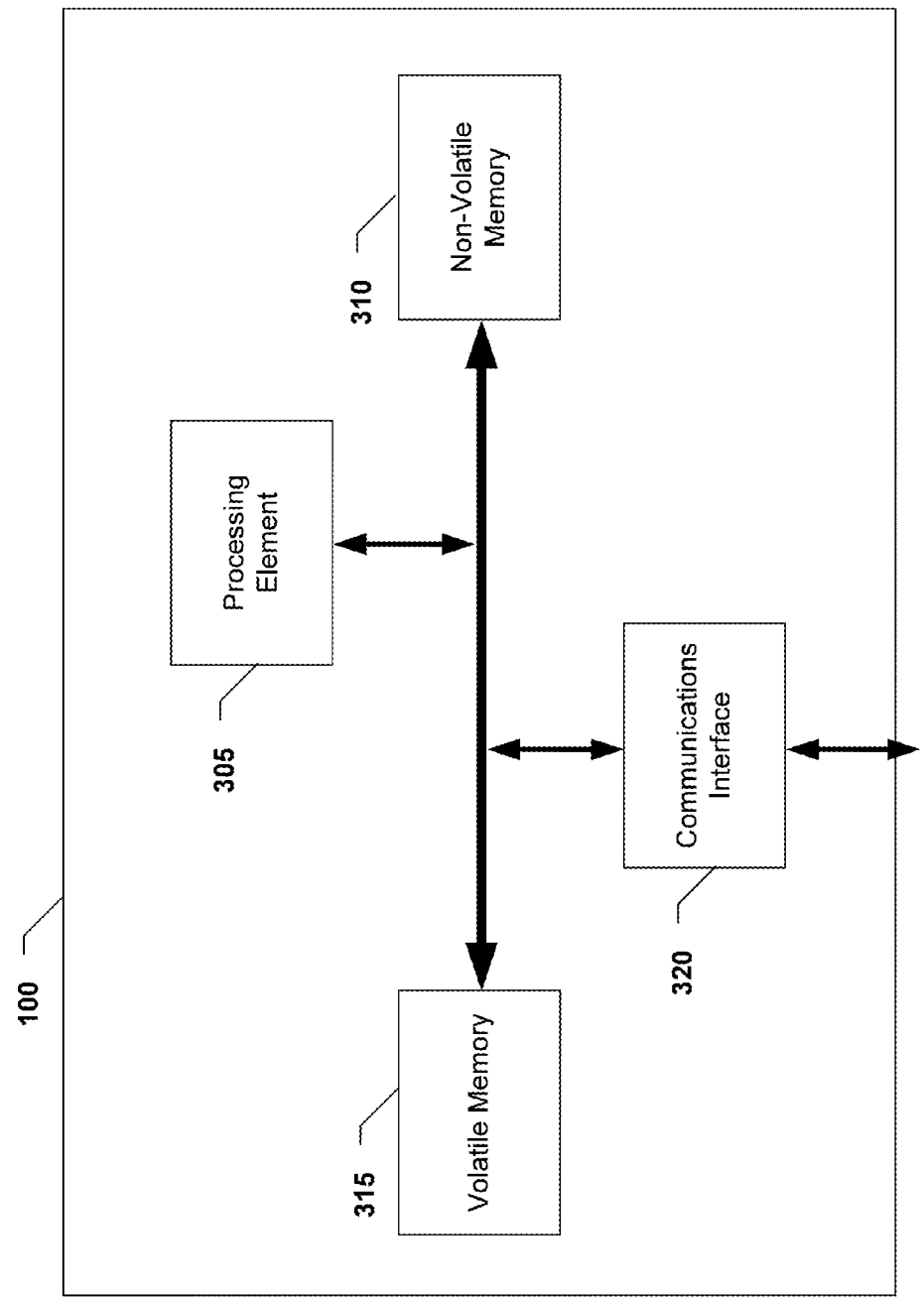
Figure 3:
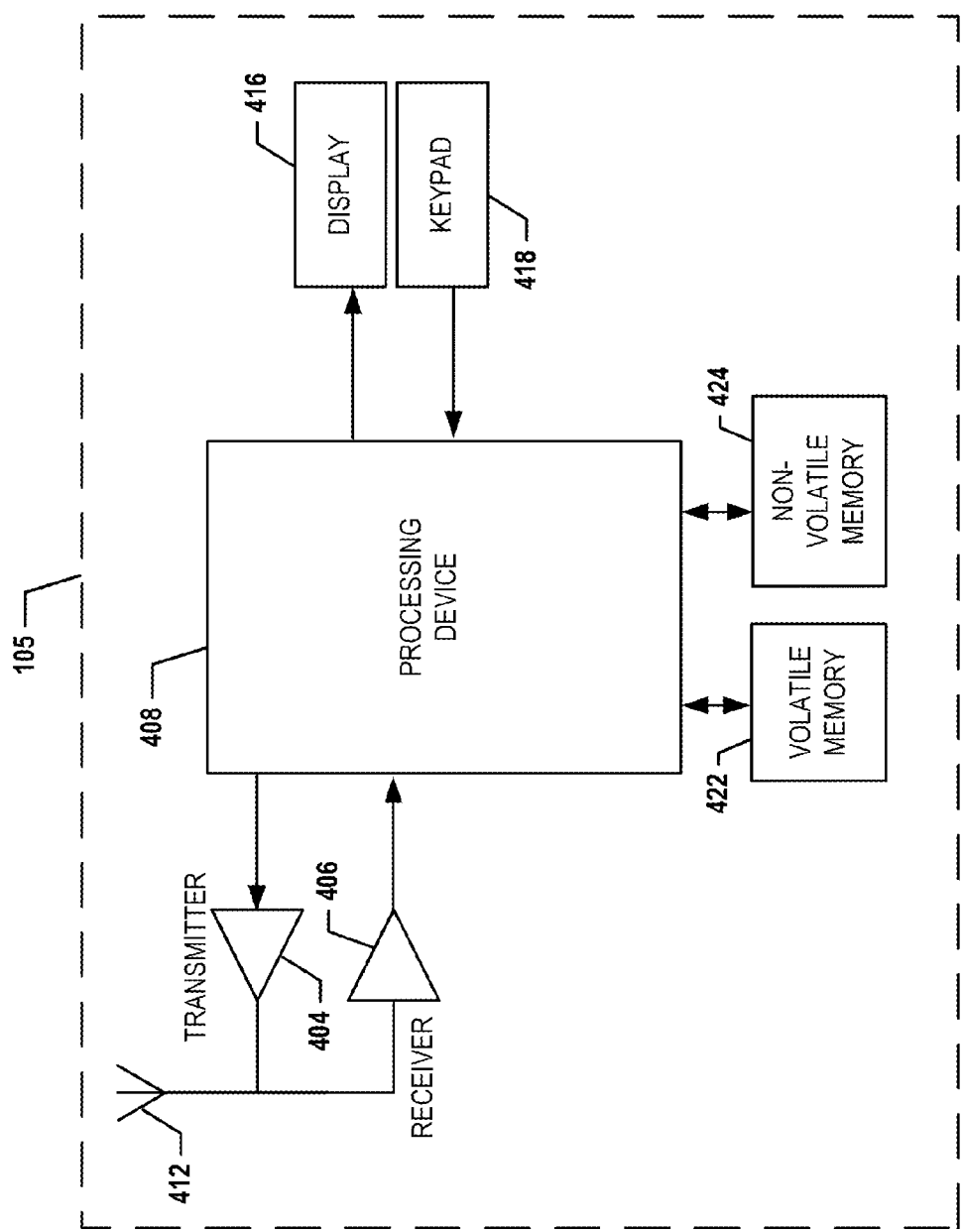
Figure 4:
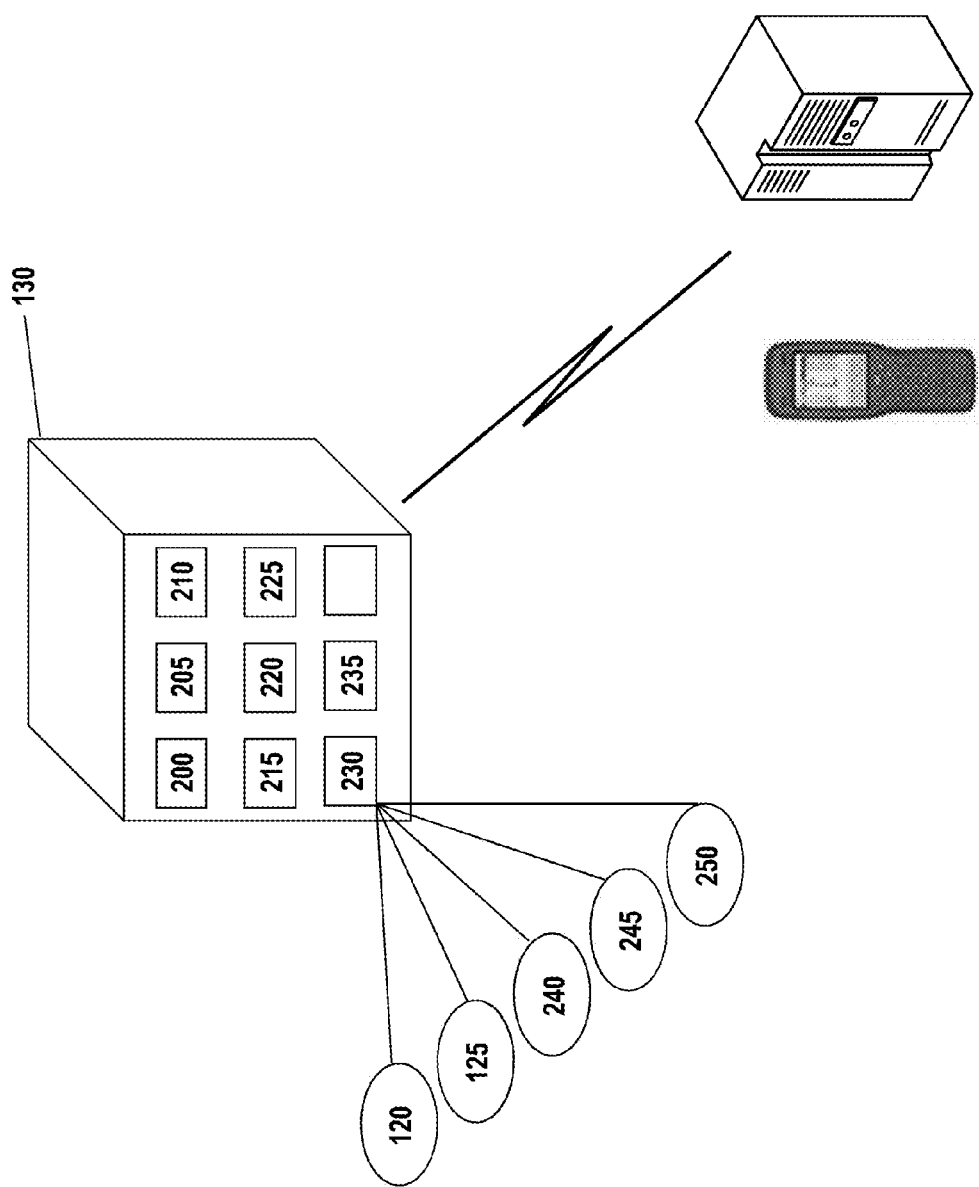
Figure 5:
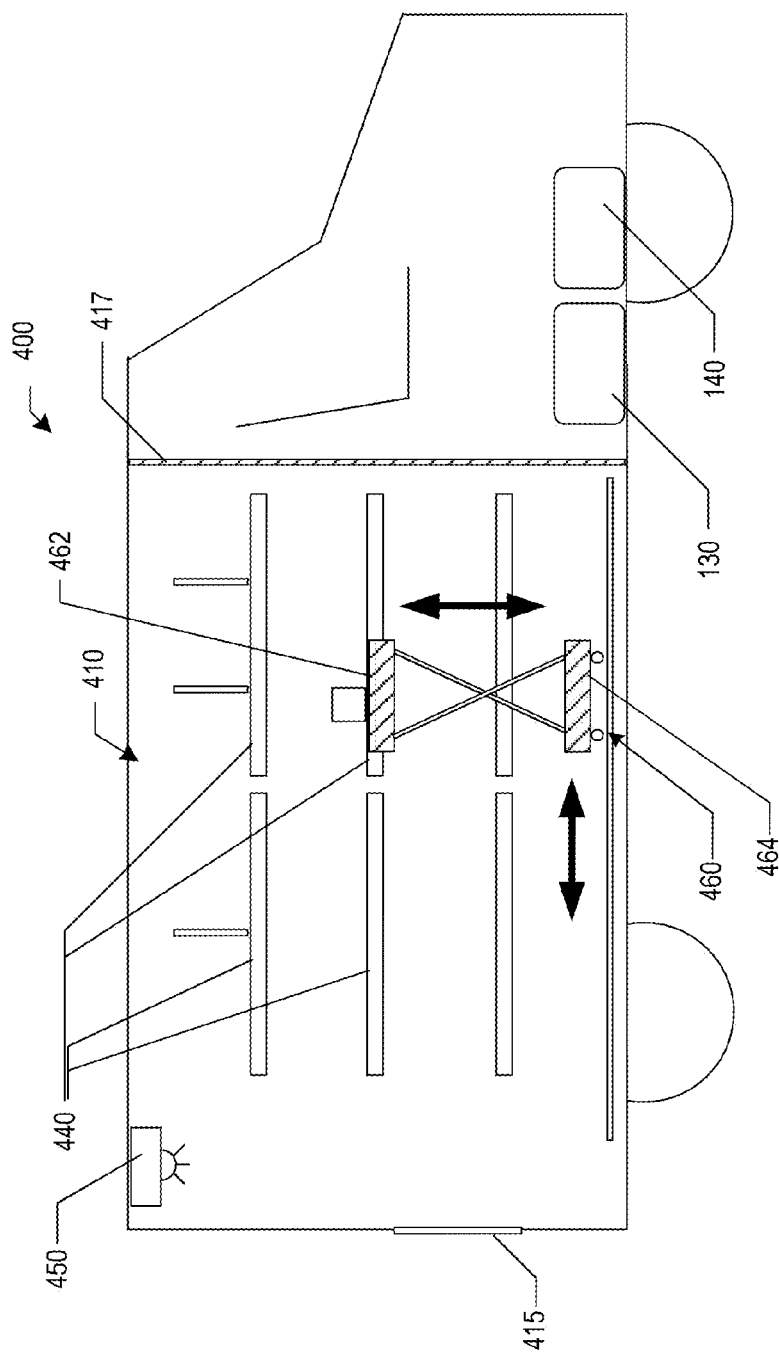
Figure 6:
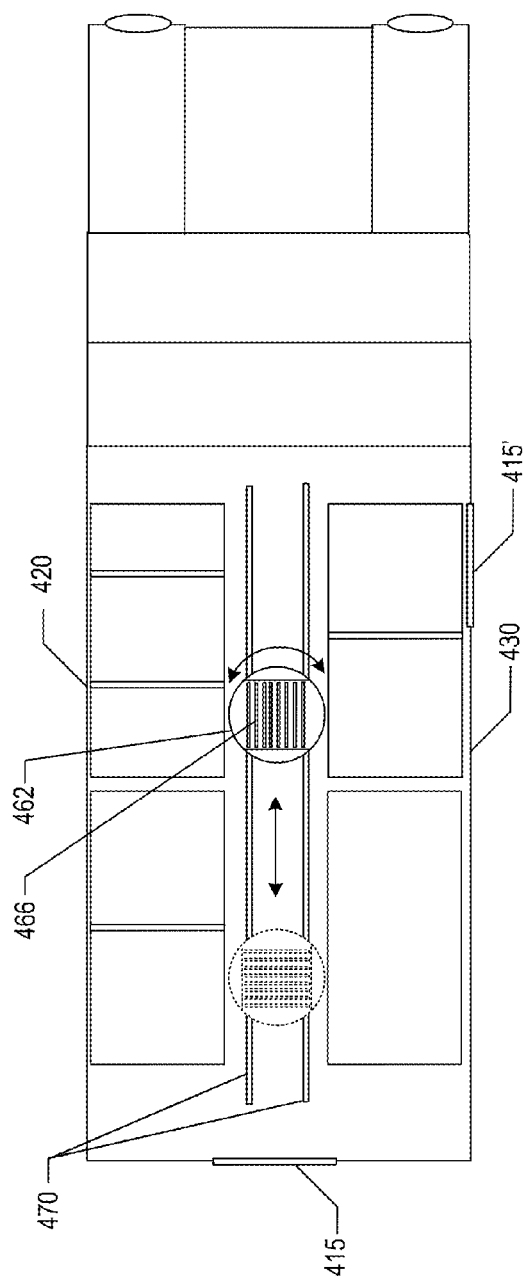
Figure 7:
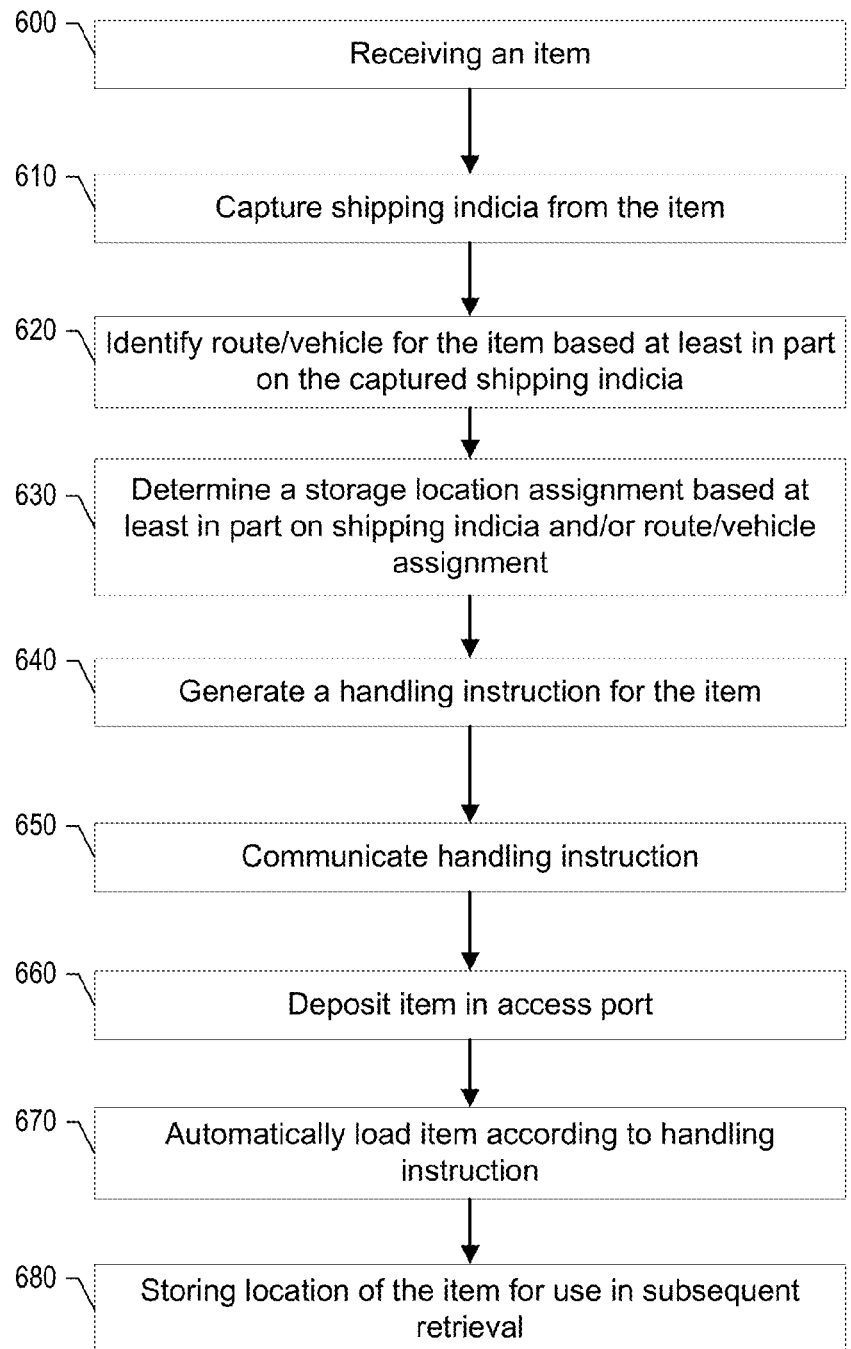
Figure 8:
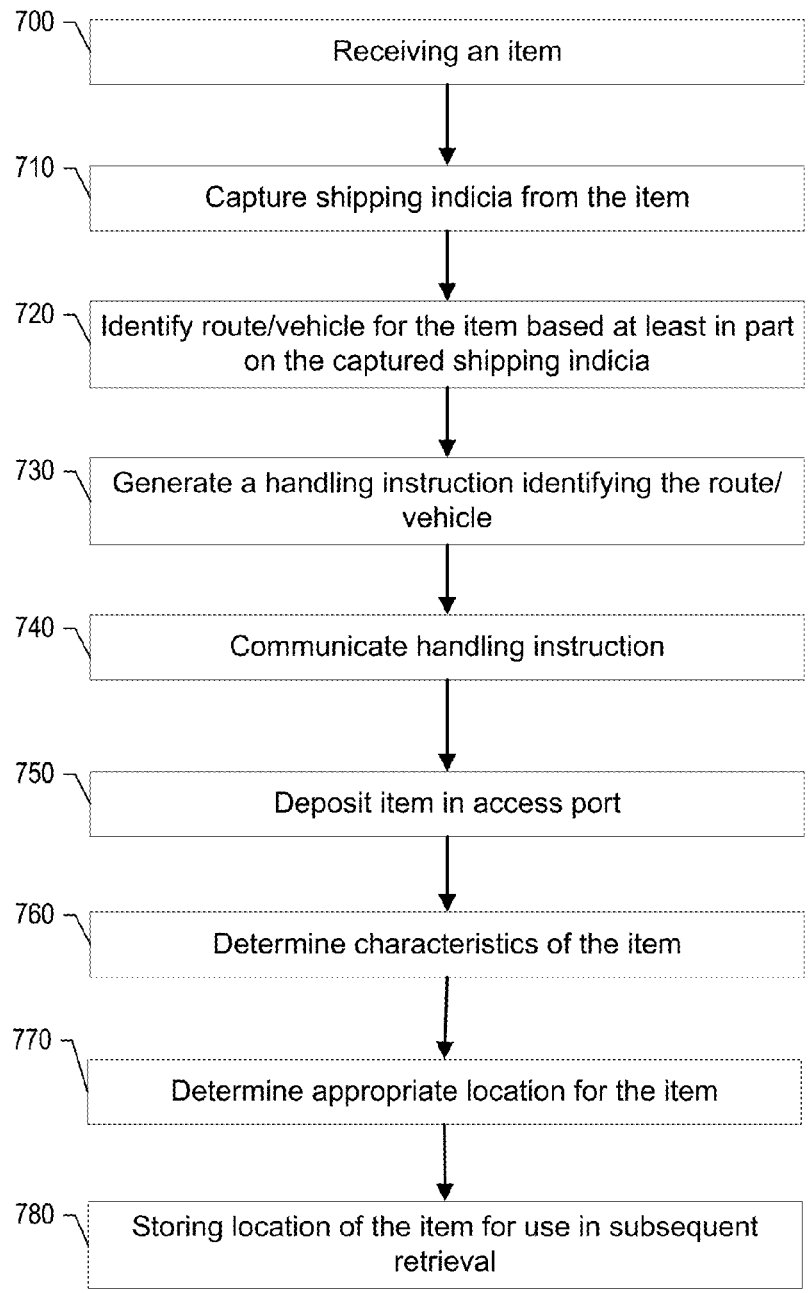
Figure 9:
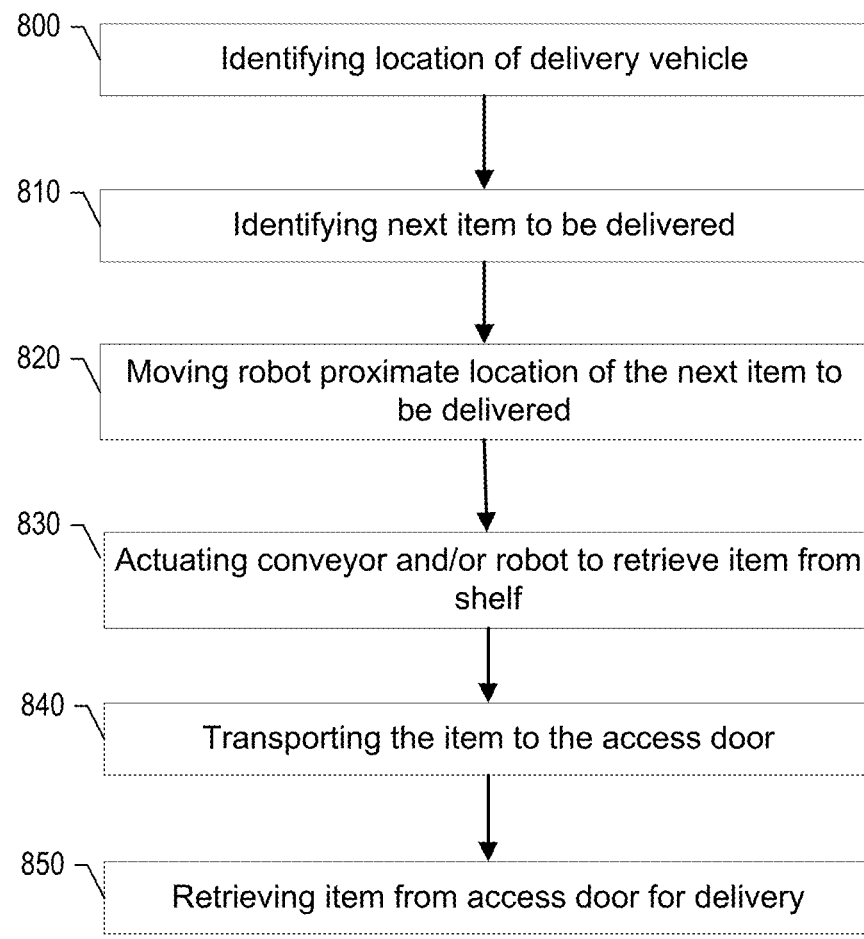
Figure 10:
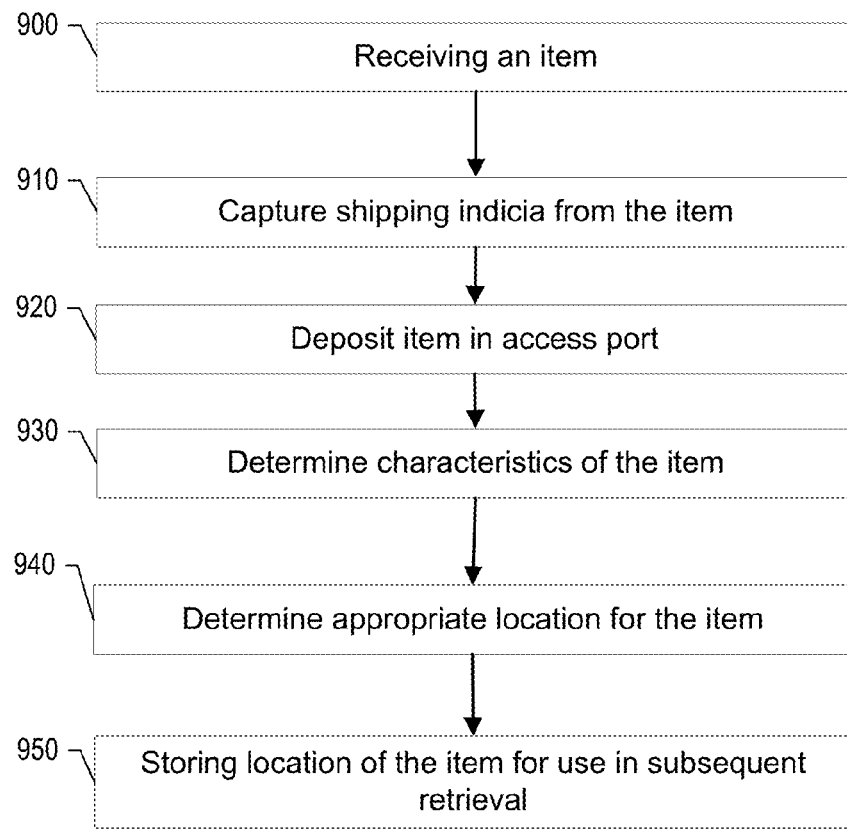

Having thus described the invention in general terms, reference will now be made to the accompanying drawings, which are not necessarily drawn to scale, and wherein:

FIG. 1 is a schematic diagram of various aspects of an embodiment of the present invention;

FIG. 2 is a schematic block diagram of a carrier system 100 that may be used in association with certain embodiments of the present invention;

FIG. 3 is a schematic block diagram of a mobile computing device that may be used in association with certain embodiments of the present invention;

FIG. 4 is a schematic diagram of a data collection device that may be used in association with certain embodiments of the present invention;

FIG. 5 is a side-view schematic diagram of a delivery vehicle 400 that may be used in association with certain embodiments of the present invention;

FIG. 6 is a top-view schematic diagram of a delivery vehicle 400 that may be used in association with certain embodiments of the present invention;

FIG. 7 is a block diagram illustrating steps that may be performed in loading items into a delivery vehicle according to an example embodiment;

FIG. 8 is a block diagram illustrating steps that may be performed in depositing items within a delivery vehicle according to an example embodiment; and FIG. 9 is a block diagram illustrating steps that may be performed in retrieving items from a delivery vehicle according to an example embodiment;

FIG. 10 is a block diagram illustrating steps that may be performed in depositing items into a delivery vehicle according to an example embodiment.

Figure 11:
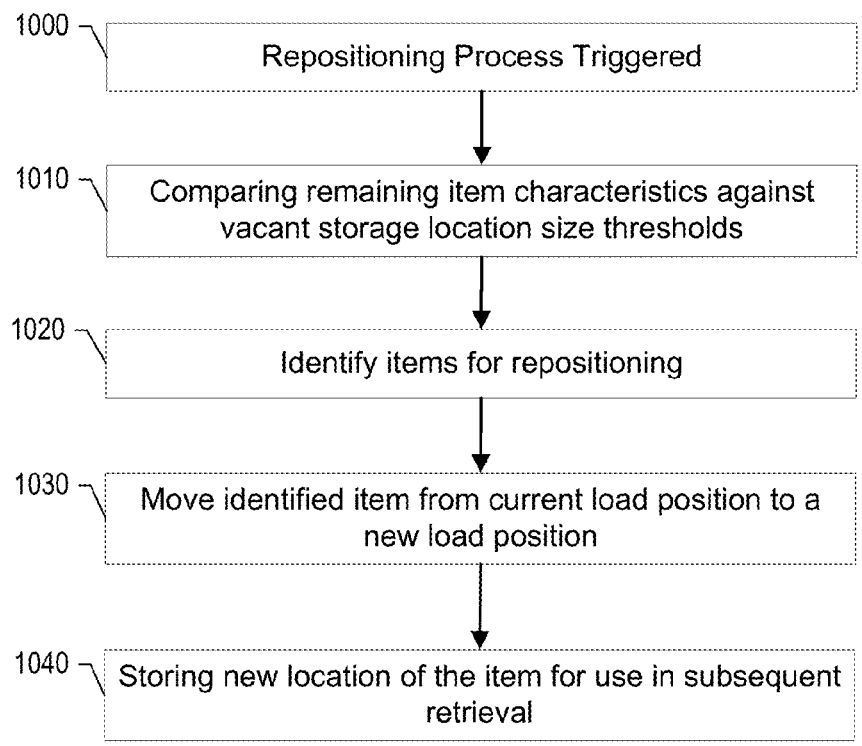

FIG. 11 is a block diagram illustrating steps that may be performed in reposting items within a delivery vehicle according to an example embodiment.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

A. System Overview

FIG. 1 illustrates an overview of a system 10 configured to load items according to an example embodiment. It should be understood that the system depicted in FIG. 1 is merely one example configuration of a system for loading items and that many other configurations are possible. As illustrated, the exemplary system 10 may include one or more conveying systems 5, one or more loading stations 30, once or more carrier systems 100, one or more mobile computing entities 105, and one or more delivery vehicles 400. The loading stations 30 may include a data capture device 32, a user interface 34 and a label printer (not shown). In addition, the one or more carrier systems 100 may receive information from the data capture devices for tracking and other purposes. In addition, the one or more carrier systems 100 may also provide handling instructions regarding the appropriate delivery vehicle 40 and storage location for placement of a particular item. Various components of the system may communicate via network 90.

As will be recognized, an item 2 may be a parcel or group of parcels, a package or group of packages, scrap metal banded together, a vehicle part, a box, a crate, a drum, a box strapped to a pallet, and/or the like. In one embodiment, each item may include an item/shipment identifier, such as a barcode, a MaxiCode, electronic representation, and/or text (e.g., alphanumeric text). The unique item/shipment identifier (e.g., 123456789) may be used by the carrier to identify and track the item as it moves through the carrier's transportation network. Such item/shipment identifiers can be affixed to items by, for example, using a sticker (e.g., label) with the unique item/shipment identifier printed thereon (in human and/or machine readable form) or an RFID tag with the unique item/shipment identifier stored therein. In addition to the item/shipment identifier, the label or RFID tag may also include other shipping information such as a destination address which may also be captured.

Generally described, items are received at a loading station 30 where identification data may be captured for each item and handling instructions may be generated. In some embodiments, a label having indicia associated with the item may be generated and affixed to the item. The items may then be deposited through an access door into the vehicle identified in the handling instructions. Once the items are loaded into the access door, an automated load/unload device may deposit the item in the appropriate storage location. Provided below is a more detailed discussion of aspects of various embodiments.

B. Exemplary Conveying System

The conveying system 5 may be any device or accumulation of devices for moving items. For example, the conveying system 5 could be a series of belts, conveyors, and/or shoots that divert items from a sorting and/or receiving location to a loading station 30. Other embodiments may include moving a plurality of items in batches via pallets, boxes, bins or other devices. For example, items may be consolidated based on a variety of criteria, for example, destination addresses within a threshold area, assignment to (1) the same delivery vehicle, (2) the same loading station, (3) the same shelf in the vehicle 400, and the like. The consolidation may occur at the loading station 30 or at upstream processes with the items being disposed into a container. Thus, the items would be processed as a group as opposed to being processed individually (e.g., sorted, moved to a loading station, loaded into the vehicle via the access door, deposited automatically deposited at the appropriate storage location, etc.). In various embodiments, items bound for a particular neighborhood, apartment complex, shopping center and the like may be consolidated into a single container. As used herein, the terms "item" and "container of items" are interchangeable.

C. Exemplary Loading Stations

Items received at a facility may be conveyed by the conveying system 5 to one or more loading stations 30. In various embodiments, the loading station 30 includes a data capture device 32, a user interface 34, a printer (not shown) and/or a mobile computing entity 105. The mobile computing entity 105 may include a data capture device and a user interface. The data capture device 32 may be a barcode or MaxiCode scanning device, an RFID interrogator, a camera, or other data capture device.

The data capture device 32, user interface 34, printer, mobile computing entity 105 and one or more carrier systems 100 may be in electronic communication with, for example, one another over the network 90 which may be the same or different wireless or wired networks including, for example, a wired or wireless Personal Area Network (PAN), Local Area Network (LAN), Metropolitan Area Network (MAN), Wide Area Network (WAN), or the like.

In various embodiments, the user interface 34 (and/or mobile computing entity 105) may include a display device/input device for receiving and displaying data may also be included in or associated with the carrier system 100. The display device/input device may be, for example, a keyboard or pointing device that is used in combination with a monitor.

In one embodiment, the data capture device 32 (and/or mobile computing entity 105) scans or reads the item/shipment identifier and other appropriate information (e.g., location and time of the scan or reading) and communicates the information to the one or more carrier systems 100.

Using the captured information, the one or more carrier systems 100 provides handling instructions to the loading personnel via the user interface 34 and/or mobile computing entity 105. As will be discussed in greater detail below, the handling instructions may include a vehicle identifier and a storage location identifier.

In some embodiments, an item may be received at a loading station 30 with a label having human-readable and or machine-readable indicia providing handling instructions. In this case, the loading personnel may follow the handing instructions and load the items into the appropriate vehicle accordingly (e.g., a label applied upstream of the loading station 30). In further embodiments, the data capture device 32 (and/or mobile computing entity 105) may scan/read machine-readable indicia from the label to retrieve the instructions (e.g., a label applied at the receiving station, a shipping label, etc.). In this case, the instructions may be communicated to the loading personnel via the user interface 34 (and/or mobile computing entity 105).

Moreover, in various embodiments, the loading station 30 may comprise an item buffer configured to store one or more items after being received at the loading station but before being loaded into an appropriate vehicle. Thus, such item buffer may accommodate a plurality of items received by the loading station 30 in rapid succession such that the items are not loaded into an appropriate vehicle before a subsequent item is received.

D. Exemplary Carrier System

FIG. 3 provides a schematic of a carrier system 100 according to an embodiment of the present invention. In general, the terms computing entity, entity, device, system, and/or similar words used herein interchangeably may refer to, for example, one or more computers, computing entities, mobile phones, desktops, tablets, notebooks, laptops, distributed systems, gaming consoles (e.g., Xbox, Play Station, Wii), watches, glasses, key fobs, RFID tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on information/data, content, information, and/or similar terms used herein interchangeably.

As indicated, in one embodiment, the carrier system 100 may also include one or more communications interfaces 320 for communicating with various computing entities, such as by communicating information/data, content, information, and/or similar terms used herein interchangeably that can be transmitted, received, operated on, processed, displayed, stored, and/or the like. For instance, the carrier system 100 may communicate with vehicles 400, mobile computing entities 105, and/or the like.

As shown in FIG. 3, in one embodiment, the carrier system 100 may include or be in communication with one or more processing elements 305 (also referred to as processors, processing circuitry, and/or similar terms used herein interchangeably) that communicate with other elements within the carrier system 100 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly.

In one embodiment, the carrier system 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, information/data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or data that is stored in a computer-readable storage medium, such as via a relational database, hierarchical database, and/or network database.

In one embodiment, the carrier system 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, information/data, applications, programs, program modules, scripts, source code, object code, byte code, compiled code, interpreted code, machine code, executable instructions, and/or the like being executed by, for example, the processing element 305. Thus, the databases, database instances, database management system entities, information/data, applications, programs, program modules, scripts, source code, object code, byte code, compiled code, interpreted code, machine code, executable instructions, and/or the like may be used to control certain aspects of the operation of the carrier system 100 with the assistance of the processing element 305, an operating system, and a mapping/routing platform.

As indicated, in one embodiment, the carrier system 100 may also include one or more communications interfaces 320 for communicating with various computing entities, such as by communicating information/data, content, information, and/or similar terms used herein interchangeably that can be transmitted, received, operated on, processed, displayed, stored, and/or the like. For instance, the carrier system 100 may communicate with computing entities or communication interfaces of the vehicle 400, mobile computing entities 105, and/or the like.

Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the carrier system 100 may be configured to communicate via wireless external communication networks using any of a variety of protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. Although not shown, the carrier system 100 may include or be in communication with one or more input elements, such as a keyboard input, a mouse input, a touch screen/display input, audio input, pointing device input, joystick input, keypad input, and/or the like. The carrier system 100 may also include or be in communication with one or more output elements (not shown), such as audio output, video output, screen/display output, motion output, movement output, and/or the like.

The carrier system 100 may also comprise, be associated with, or be in communication with various other systems, such as a mapping/routing platform, an Address Matching System (AMS), a Package Center Information System (PCIS), a Customized Pickup and Delivery System (CPAD), a dispatch management system (DMS), preload assist system (PAS), Customer Action and Response System (CAReS), Dispatch Planning System (DPS), dispatch download system (e.g., for downloading delivery sequence to mobile devices) and a variety of other systems and their corresponding components all referred to herein individually and/or collectively as the mapping/routing computing entity. Thus, as will be appreciated, one or more of the mapping/routing computing entity's components may be located remotely from other carrier system 100 components, such as in a distributed system. Furthermore, one or more of the components may be combined and additional components performing functions described herein may be included in the mapping/routing computing entity. Thus, the carrier system 100 can be adapted to accommodate a variety of needs and circumstances.

E. Exemplary Mobile Computing Entity

FIG. 4 provides an illustrative schematic representative of a mobile computing entity 105 that can be used in conjunction with embodiments of the present invention. In one embodiment, the mobile computing entities 105 may include one or more components that are functionally similar to those of the carrier system 100 and/or as described below. As will be recognized, mobile computing entities 105 can be operated by various parties, including operators of vehicles 400. As shown in FIG. 4, a mobile computing entity 105 can include an antenna 412, a transmitter 404 (e.g., radio), a receiver 406 (e.g., radio), and a processing element 408 that provides signals to and receives signals from the transmitter 404 and receiver 406, respectively.

The signals provided to and received from the transmitter 404 and the receiver 406, respectively, may include signaling data in accordance with an air interface standard of applicable wireless systems to communicate with various entities, such as vehicles 400, mapping/routing computing entities, and/or the like. In this regard, the mobile computing entity 105 may be capable of operating with one or more air interface standards, communication protocols, modulation types, and access types. More particularly, the mobile computing entity 105 may operate in accordance with any of a number of wireless communication standards and protocols. In a particular embodiment, the mobile computing entity 105 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile computing entity 105 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The mobile computing entity 105 can also download changes, add-ons, and updates, for instance, to its firmware, software (e.g., including executable instructions, applications, program modules), operating system, and mapping/routing platform.

According to one embodiment, the mobile computing entity 105 may include location determining aspects, devices, modules, functionalities, and/or similar words used herein interchangeably. For example, the mobile computing entity 105 may include outdoor positioning aspects, such as a location module adapted to acquire, for example, latitude, longitude, altitude, geocode, course, direction, heading, speed, UTC, date, and/or various other information/data. In one embodiment, the location module can acquire information/data, sometimes known as ephemeris information/data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined/identified by triangulating the mobile computing entity's 105 position in connection with a variety of other systems, including cellular towers, Wi-Fi access points, and/or the like. Similarly, the mobile computing entity 105 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine/identify the location of someone or something to within inches or centimeters.

The mobile computing entity 105 may also comprise a user interface (that can include a display 416 coupled to a processing element 408) and/or a user input interface (coupled to a processing element 408). For example, the user interface may be an application, browser, user interface, dashboard, webpage, and/or similar words used herein interchangeably executing on and/or accessible via the mobile computing entity 105 to interact with and/or cause display of information. The user input interface can comprise any of a number of devices allowing the mobile computing entity 105 to receive information/data, such as a keypad 418 (hard or soft), a touch display, voice/speech or motion interfaces, scanners, readers, or other input device. In embodiments including a keypad 418, the keypad 418 can include (or cause display of) the conventional numeric (0-9) and related keys (#, *), and other keys used for operating the mobile computing entity 105 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the mobile computing entity can collect contextual information/data as part of the telematics information/data.

The mobile computing entity 105 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, information/data, applications, programs, program modules, scripts, source code, object code, byte code, compiled code, interpreted code, machine code, executable instructions, and/or the like to implement the functions of the mobile computing entity 105.

F. Exemplary Delivery Vehicles

In various embodiments, the term vehicle 400 is used generically. For example, a vehicle 400 may be a tractor, a truck, a car, a trailer, a tractor and trailer combination, a van, a flatbed truck, a vehicle, drone, airplane, helicopter, and/or any other form of object for moving or transporting people and/or items (e.g., one or more packages, parcels, bags, containers, loads, crates, items banded together, vehicle parts, pallets, drums, the like, and/or similar words used herein interchangeably). Although in certain embodiments, the vehicle may be unmanned. In one embodiment, each vehicle 400 may be associated with a unique vehicle identifier (such as a vehicle ID) that uniquely identifies the vehicle 400. The unique vehicle ID (e.g., trailer ID, tractor ID, vehicle ID, and/or the like) may include characters, such as numbers, letters, symbols, and/or the like. For example, an alphanumeric vehicle ID (e.g., "AS445") may be associated with each vehicle 400. In another embodiment, the unique vehicle ID may be the license plate, registration number, or other identifying information assigned to the vehicle 400.

FIG. 4 shows one or more computing entities, devices, and/or similar words used herein interchangeably that are associated with the vehicle 400, such as a data collection device 130 or other computing entities. In general, the terms computing entity, entity, device, system, and/or similar words used herein interchangeably may refer to, for example, one or more computers, computing entities, mobile phones, desktops, tablets, notebooks, laptops, distributed systems, gaming consoles (e.g., Xbox, Play Station, Wii), watches, televisions, dongles, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. FIG. 4 provides a block diagram of an exemplary data collection device 130 that may be attached, affixed, disposed upon, integrated into, or part of a vehicle 400. The data collection device 130 may collect telematics data (including location data) and transmit/send the data to the mobile computing entity 105 and/or various other computing entities via one of several communication methods.

In one embodiment, the data collection device 130 may include, be associated with, or be in communication with one or more processors 200 (various exemplary processors are described in greater detail below), one or more location-determining devices or one or more location sensors 120 (e.g., Global Navigation Satellite System (GNSS) sensors), one or more telematics sensors 125, one or more real-time clocks 215, a J-Bus protocol architecture, one or more electronic control modules (ECM) 245, one or more communication ports 230 for receiving telematics data from various sensors (e.g., via a CAN-bus), one or more communication ports 205 for transmitting/sending data, one or more RFID tags/sensors 250, one or more power sources 220, one or more data radios 235 for communication with a variety of communication networks, one or more memory modules 210, and one or more programmable logic controllers (PLC) 225. It should be noted that many of these components may be located in the vehicle 400 but external to the data collection device 130.

In one embodiment, the one or more location sensors 120, modules, or similar words used herein interchangeably may be one of several components in communication with or available to the data collection device 130. Moreover, the one or more location sensors 120 may be compatible with GPS satellites 115, such as Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, triangulation may be used in connection with a device associated with a particular vehicle and/or the vehicle's operator and with various communication points (e.g., cellular towers or Wi-Fi access points) positioned at various locations throughout a geographic area to monitor the location of the vehicle 400 and/or its operator. The one or more location sensors 120 may be used to receive latitude, longitude, altitude, heading or direction, geocode, course, position, time, and/or speed data (e.g., referred to herein as telematics data and further described herein below). The one or more location sensors 120 may also communicate with the mapping computing entity, the data collection device 130, mobile computing entity 105, and/or similar computing entities.

As indicated, in addition to the one or more location sensors 120, the data collection device 130 may include and/or be associated with one or more telematics sensors 125, modules, and/or similar words used herein interchangeably. For example, the telematics sensors 125 may include vehicle sensors, such as engine, fuel, odometer, hubometer, tire pressure, location, weight, emissions, door, and speed sensors. The telematics data may include, but is not limited to, speed data, emissions data, RPM data, tire pressure data, oil pressure data, seat belt usage data, distance data, fuel data, idle data, and/or the like (e.g., referred to herein as telematics data). The telematics sensors 125 may include environmental sensors, such as air quality sensors, temperature sensors, and/or the like. Thus, the telematics data may also include carbon monoxide (CO), nitrogen oxides (NOx), sulfur oxides (SOx), Ethylene Oxide (EtO), ozone ($O_3$), hydrogen sulfide ($H_2S$) and/or ammonium ($NH_4$) data, and/or meteorological data (e.g., referred to herein as telematics data).

In one embodiment, the ECM 245 may be one of several components in communication with and/or available to the data collection device 130. The ECM 245, which may be a scalable and subservient device to the data collection device 130, may have data processing capability to decode and store analog and digital inputs from vehicle systems and sensors. The ECM 245 may further have data processing capability to collect and present telematics data to the J-Bus (which may allow transmission to the data collection device 130), and output standard vehicle diagnostic codes when received from a vehicle's J-Bus-compatible on-board controllers 240 and/or sensors.

As indicated, a communication port 230 may be one of several components available in the data collection device 130 (or be in or as a separate computing entity). Embodiments of the communication port 230 may include an Infrared data Association (IrDA) communication port, a data radio, and/or a serial port. The communication port 230 may receive instructions for the data collection device 130. These instructions may be specific to the vehicle 400 in which the data collection device 130 is installed, specific to the geographic area in which the vehicle 400 will be traveling, specific to the function the vehicle 400 serves within a fleet, and/or the like. In one embodiment, the data radio 235 may be configured to communicate with a wireless wide area network (WWAN), wireless local area network (WLAN), wireless personal area network (WPAN), or any combination thereof. For example, the data radio 235 may communicate via various wireless protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols (including Bluetooth low energy (BLE)), wireless universal serial bus (USB) protocols, and/or any other wireless protocol.

FIGS. 5 and 6 illustrate an exemplary delivery vehicle 400. In the illustrated embodiment, the cargo area 410 comprises an access port 415, a bulkhead 417 separating a driver area from the cargo area 410, a driver side wall 420 and a passenger side wall 430. The cargo area 410 includes a plurality of storage locations configured to receive items for transport. The storage areas may include one or more bins, shelves and/or the like configured to store items. The illustrated embodiment includes 12 shelves (six on each side of the cargo area 410) but other embodiments may include more or less shelves/bins.

In various embodiments, the storage locations may comprise rollers, powered rollers, conveyor belts or the like that are configured to bias items toward the outer wall of the vehicle 400 and/or towards the center of the vehicle 400. These devices may be selectively activated by the controller 140 to either position items toward the outer wall of the vehicle 400 and/or towards the center of the vehicle 400 as desired.

The vehicle 400 may also be equipped with an automated load/unload device 460. In various embodiments, the automated load/unload device 460 is configured to capture items and move the item to and from storage locations within the vehicle 400. In one embodiment, the automated load/unload device 460 comprises a turntable robot that includes a platform 462 configured to receive an item operatively connected to a base 464. The platform 462 may be raised or lowered relative to the base 464 using a scissor lift, rack and pinion, ball screw or other lifting mechanism. The platform may also include one or more powered rollers 466, conveyor belts or the like to convey items onto and off of the platform 462. In some embodiments, the platform 462 may tilt to convey an item. As noted, the platform 462 may also be configured to rotate to receive/deposit items in a plurality of directions.

In some embodiments, the automated load/unload device moves fore and aft within the vehicle cargo 410 area via one or more rails. The automated load/unload device may use a gear drive, friction wheels with motor or the like to move along the rails. In other embodiments, tracks, recesses, and the like may be used to facilitate movement of the robot within the vehicle cargo bay.

In further embodiments, the automated load/unload device 460 may be an articulated robot arm that includes a gripping mechanism for grasping items and depositing the items at the appropriate position. The robot arm may be mounted on a base that travels fore and aft within the vehicle to facilitate access to at least a portion of the storage locations. In other embodiments, the range of motion of the robot arm may be sufficient to reach the access port and the desired storage locations. In still further embodiments, a conveyor may be positioned within the vehicle 400 to transport items from the access port 415 to within the travel of the articulated robot arm.

The automated load/unload device 460 and the storage locations may be activated/controlled by a controller 140 mounted within the vehicle 400. The controller 140 may be in wired or wireless communication with the storage locations and the automated load/unload device 460 to provide activation signs and position instructions. In various embodiments, the controller 140 stores the identification of the items, where the items are positioned within the vehicle and when they are removed from the vehicle. The controller 140 may also record the physical location of the vehicle (e.g., GPS location) when an item is positioned within the vehicle and/or when the vehicle is removed from the vehicle. Finally, the controller 140 may also monitor the status of the storage locations (e.g., occupied, empty).

G. Exemplary Controller 140

In one embodiment, the controller 140 may include one or more components that are functionally similar to those of the mobile computing entity 105. For example, in one embodiment, the controller 140 may include: (1) a processing element that communicates with other elements via a system interface or bus; (2) a user interface; (3) transitory and non-transitory memory; and (4) a communications interface. As previously noted, the controller 140 may comprise a user interface. For example, the user interface may be an application, browser, user interface, dashboard, webpage, and/or similar words used herein interchangeably executing on and/or accessible via the controller 140 to interact with and/or cause display of information from the carrier server 100 and/or the mobile computing entity 105, as described herein. These architectures are provided for exemplary purposes only and are not limiting to the various embodiments.

III. Exemplary Methods of Operation

Having thus provided an overview of components which may be included in a system for loading/unloading items according to various embodiments, attention is now directed to FIGS. 7-11, which depict steps that may be performed in accordance with various embodiments.

A. Depositing Items into Vehicles Based on Delivery Sequence

FIG. 7 illustrates steps that may be performed in accordance with various embodiments to assign and load items onto a vehicle 400. The process begins at Block 600 where an item is received at a loading station 30. At Block 610, the associated shipping indicia are captured. In various embodiments, the shipping indicia include item/shipment identifier and/or destination address information. The captured shipping indicia are transmitted to the one or more carrier systems 100. The one or more carrier systems 100 identify destination information (either captured or determined using the item/shipment identifier) and compare the destination address against a dispatch plan to determine which route/vehicle is assigned to deliver to the destination address at Step 620. In some embodiments, the destination address may be captured and sent to the one or more carrier systems 100 in addition to or in place of the item/shipment unique identifier.

After identifying the route/vehicle, the one or more carrier systems 100 may then generate a handling instruction identifying the appropriate route/vehicle and a storage location on the vehicle for the item at Block 630. To identify the appropriate storage location, the one or more carrier systems 100 may divide the route according to the number of shelving units assigned to the route. Assuming the vehicle has 12 shelves, the route would be divided into twelve sequential segments. Items to be delivered during the first segment may be assigned, for example, to a particular shelf for the route (e.g., top Forward Driver-side location) and items assigned to the second sequential segment may be assigned to a second shelf (e.g., middle Forward Driver-side location). The associated item IDs would then be linked or otherwise associated with the appropriate shelf location by the one or more carrier systems 100. The sequential segments may be similarly divided by the number of storage locations on the shelf. The one or more carrier systems 100 may assign the items to the storage location according to the order in which they may be delivered. The shelves may have dividers separating the different storage locations.

In various embodiments, the handing instructions may be communicated via a label at Step 650. The handling instruction may be communicated via a label generated and affixed to the item, an instruction provided on the mobile computing entity 105, a visual indicator proximate the appropriate vehicle (e.g., a light) or the like. In one embodiment, the label may be generated at the loading station 30 or in an upstream process. The label may include indicia communicating the vehicle ID, the shelf and/or a storage location. Other information on the label may include a package tracking number, primary and secondary package sortation information, a commit time and an irregular drop-off indicator.

In one embodiment, an order is set in a dispatch plan and takes into account the direction a driver will be delivering for a particular street range. The commit time indicator on the label may indicate when a package is committed for delivery at a particular time. The commit time may be based on the service level desired by the customer, such as for example Next Day Air, Second Day Air or Ground. The irregular drop-off indicator on the label may indicate the location in the facility where irregular items are sorted manually. Irregular items are typically too large or too heavy or shaped in such a way that they cannot be placed on a sortation belt. A more detailed discussion of possible loading schemes that could be used for a shelf is described in U.S. Pat. No. 8,068,930, which is incorporated by reference herein in its entirety.

At Block 660, a loading operator retrieves the item from the conveying system 5 and deposits the item into the appropriate vehicle 400 via the vehicle access port 415. In some embodiments, the item is placed directly onto a platform of the automated load/unload device 460 inside the vehicle 400 (e.g., including an item buffer). In other embodiments, the item may be placed on a separate platform or conveyor that positions the item within reach of the automated load/unload device 460 (e.g., including an item buffer).

At Block 670, the appropriate storage location is determined and communicated to/captured by the controller 140. In some embodiments, the vehicle 400 includes a data capture device 450 which captures indicia from the item. The indicia may include the handling instruction, the unique identifier for the item, a destination address, and/or other information. Using this captured information, the controller 140 identifies (by itself or in conjunction with the carrier system 100) where the item is to be positioned. In some embodiments, the controller 140 communicates with the data capture device 32 and/or the mobile computing entity 105 at the loading station 30 and receives the storage location identification as opposed to using information captured by data capture device 450. In this embodiment, the controller recognizes when the item is placed into the vehicle via a light curtain, proximity switch on the platform or the automated load/unload device 460 and then associates the received storage location with the item.

After acquiring the storage location, the controller 140 sends an actuation signal to the automated load/unload device 460 to position the item onto the appropriate storage location. For example, if the captured indicia include the handling instructions with a storage location identifier, the controller 140 will send a signal to the automated load/unload device 460 to move to the appropriate location (i.e. fore/aft to the appropriate location and up/down relative to the appropriate storage location) and deposit the item at the appropriate location. In some embodiments, the controller 140 will also send a signal to the appropriate storage location to initiate movement of the associated power rollers/conveyors to receive the item and bias the item against the associated side wall of the vehicle 400. In various embodiments, the controller 140 stores the location of the item in memory for later retrieval when the item is to be delivered. After positioning the item onto the appropriate location, the automated load/unload device 460 may return to its home position, ready to position an additional item.

B. Depositing Items into Vehicles Based on Item Characteristics

In a further embodiment, the loading scheme may be based on characteristics of the item as opposed to the sequence of delivery of the item. Similar to previous embodiments, the process begins at Block 700 in FIG. 8 where an item is received at a loading station 30 (e.g., including an item buffer). At Block 710, the associated shipping indicia are captured. In various embodiments, the shipping indicia may include item/shipment identifier and/or destination address information. The captured shipping indicia are transmitted to the one or more carrier systems 100. The one or more carrier systems 100 identifies destination information (either captured or determined using the item/shipment identifier) and compares the destination address against a dispatch plan to determine which route/vehicle is assigned to deliver to the destination address at Step 720. In some embodiments, the destination address may be captured and sent to the one or more carrier systems 100 in addition to or in place of the item/shipment unique identifier.

After identifying the route/vehicle, the one or more carrier systems 100 may then generate a handling instruction identifying the appropriate route/vehicle at Block 730 which is then communicated to the load personnel at Block 740. The handling instruction may be communicated via a label generated and affixed to the item, an instruction provide on the mobile computing entity 105, a visual indicator proximate the appropriate vehicle (e.g., a light) or the like.

At Block 750, the load personnel deposit the item into the identified vehicle 400 via the vehicle access port 415 (e.g., including an item buffer). In some embodiments, the item is placed directly onto a platform of the automated load/unload device inside the vehicle 400. In other embodiments, the item may be placed on a separate platform or conveyor that positions the item within reach of the automated load/unload device 460.

At Block 760, the controller 140 determines characteristics of the item. In some embodiments, a data capture device 450 associated with the vehicle 400 captures indicia from the item. The indicia may include identification of characteristics of the items (e.g., dimensions, weight, fragile, etc.). In other embodiments, the data capture device 450 captures a unique identifier associated with the item which is communicated to the controller 140. The controller 140 then communicates with the carrier systems 100 to obtain characteristics of the item that may be stored in a record associated with the captured indicia. In some embodiments, characteristic of the items bound for the particular vehicle may be downloaded to the controller 140 prior to loading items, in which case the controller 140 may determine characteristics of the item without further communication with the carrier systems 100. In further embodiments, the vehicle 400 may include a dimensioning device and/or weighing device to determine characteristics of the item independently. In some embodiments, characteristics are obtained from multiple sources (e.g., stored record, captured from label, and/or independently measured).

After the characteristics are acquired, the controller 140 determines where to deposit the item in the vehicle at Block 770. In various embodiments, the cargo area 410 within the vehicle 400 may be configured to store items of particular sizes/weights in particular locations. For example, some vehicles 400 may be configured with multiple storage locations to accommodate items of a predetermined threshold sizes (e.g., one or more dividers for each shelf, separate conveyors, and the like to separate items). For example, a vehicle may comprise storage locations configured to store small, medium, large items where each category of item size has an associated size threshold. In some embodiments, the cargo area 410 may include an area to accommodate irregular items that would not fit within the threshold sizes. The handling instruction may identify the storage location and/or the loading characteristics of the item (e.g., weight, dimensions, etc.)

In various embodiments, the controller 140 and/or the carrier systems 100 compares the acquired characteristics against the threshold parameters for storage locations to determine which storage locations could accommodate a particular item. The controller and/or carrier systems 100 also identifies storage locations having capacity to receive the item. In various embodiments, the controller 140 and/or carrier systems 100 monitors where items are placed and can therefore identify which storage locations are available. In some embodiments, the storage locations themselves have monitoring devices to indicate whether an item is present (e.g., proximity switches, light curtains, and the like and communicate their status to the controller 140.

After an available storage location is identified for the item, the controller 140 sends an actuation signal to the automated load/unload device 460 to position the item onto the storage location. For example, if the captured indicia include the handling instructions with a storage location identifier, the controller 140 will send a signal to the automated load/unload device to move to the appropriate location (i.e. fore/aft to the appropriate location and up/down relative to the appropriate location) and deposit the item onto the appropriate location. In some embodiments, the controller 140 will also send a signal to the appropriate storage location to initiate movement of the associated power rollers/conveyors to receive the item and bias the item against the associated side wall of the vehicle. In various embodiments, the controller 140 stores the location of the item in memory for later retrieval when the item is to be delivered. After positioning the item onto the appropriate location, the automated load/unload device 460 may return to a home position, ready to position an additional item.

C. Delivering Items

After the loading process is complete, the vehicle will proceed to deliver items according to the assigned route/dispatch plan. FIG. 9 illustrates steps that may be performed in accordance with various embodiments to deliver items. The process begins at Block 800 where the location of the vehicle 400 is monitored. In various embodiments, the vehicle 400 may include telematics devices (e.g. data collection devices 130) and/or location-determining devices 120 which monitor the progress of the vehicle 400 as it delivers and picks up items along the assigned route. The progress may be monitored based on the sequence of deliveries (e.g., first schedule delivery complete, second delivery pending, etc.) and/or based on the physical location of the vehicle (e.g., GPS location).

At Block 810, the controller 140 may determine the next item to be delivered. This determination may be made in a number of different ways. For example, the controller may retain in memory a copy of the dispatch plan indicating the sequence of delivery for the items loaded onto the vehicle 400. As items are unloaded, the controller 140 may recognize which item is next in the delivery sequence by monitoring which items are retrieved from storage. Alternatively, the controller may communicate with the driver's mobile computing entity and/or the carrier systems 100 to determine the next delivery in the delivery sequence. In this case, mobile computing entity and/or the carrier systems 100 may determine the next item to be delivered based on the location of the vehicle and/or the progress made with respect to the sequence of delivery (e.g., which package was last delivered in the assigned delivery sequence).

At Block 820, the controller 140 sends instructions to the automated load/unload device to retrieve the next item to be delivered based on a trigger event. In some embodiments, the controller 140 sends the instructions to the automated load/unload device 460 to retrieve the next item following retrieval of an item from the vehicle 400 access port 415 (e.g., a trigger event). In other embodiments, the triggering event may be when the vehicle 400 is within a threshold distance from the delivery location for an item. In some cases, the triggering event may be when the vehicle is stopped at the delivery location and the controller 140 instructs the automated load/unload device to retrieve the item associated with the location. This may be determined by the controller 140 based at least in part on telematics devices (e.g., engine off, parking brake on, seat belt released, etc.), based on location determining devices (e.g., within threshold distance, no movement for threshold time frame, etc.) and/or input from the driver via the driver's mobile computing entity (e.g., driver requesting retrieval of specific item)).

In response to the instructions, the automated load/unload device 460 and/or the associated storage location are activated to obtain the item from the storage location at Block 830. In some embodiments, the automated load/unload device 460 moves to a position proximate the appropriate storage location (i.e. fore/aft to the appropriate location and up/down relative to the appropriate storage location) and retrieves the item from the storage location. In some embodiments, the controller 140 will also send a signal to the appropriate storage location to initiate movement of associated power rollers/conveyors to urge the item onto a platform of the automated load/unload device 460 (e.g., including an item buffer). In other embodiments, the automated load/unload device 460 grasps the item from the storage location. After the item is obtained by the automated load/unload device 460, the automated load/unload device 460 transports the item to the vehicle access port 415 at Block 840 (e.g., including an item buffer). At Block 850, a driver retrieves the item via the vehicle access port and delivers the item to the delivery address.

D. Picking Up Items

In some cases, the driver and/or a shipper has a need to deposit items within the vehicle 400. For example, a delivery attempt for a particular item may be unsuccessful and/or a customer has a pickup which may be scheduled or unscheduled. In other embodiments, a customer may seek to deposit an item into the vehicle for delivery to a consignee. In further embodiments, a vehicle 400 may be parked at a predetermined location (e.g., parking lot, address, landmark, etc.) for a predetermined time period for the purpose of receiving items for delivery. FIG. 10 illustrates steps that may be performed in picking up and/or receiving items in accordance with an embodiment of the invention. The process may begin at Block 900 where the driver receives the item for placement onto the vehicle (e.g., unsuccessful delivery, customer pickup, shipper drop off). In many cases, the item may already have an assigned unique identifier (e.g., unsuccessful delivery, customer printed shipping label, etc.), and the driver will capture the unique identifier using a mobile computing entity 105 to indicate the item is being placed in the vehicle 400 at Block 910. In other cases, the driver may enter delivery information or other identifying information into the mobile computing entity 105, which may be communicated to the controller 140 and/or the carrier systems 100.

At Block 920, the item is deposited in the vehicle 400 via the access port 415 (e.g., including an item buffer). In some embodiments, the item is placed directly onto a platform of the automated load/unload device 460 inside the vehicle 400 (e.g., including an item buffer). In other embodiments, the item may be placed on a separate platform or conveyor that positions the item within reach of the automated load/unload device 460.

At Block 930, the controller 140 may determine characteristics of the item. In some embodiments, a data capture device 450 associated with the vehicle 400 captures indicia from the item. The indicia may include identification of characteristics of the items (e.g., dimensions, weight, fragile, etc.). In other embodiments, the data capture device 450 captures a unique identifier associated with the item which is communicated to the controller 140. The controller 140 then communicates with the carrier systems 100 to obtain characteristics of the item that may be stored in a record associated with the captured indicia. In some embodiments, a driver may use a mobile computing entity 105 to capture information concerning the item (e.g., unique identifier, characteristics, etc.) and communicate this information to the controller 140 and/or the carrier systems 100. In a further embodiment, the vehicle 400 may include a dimensioning device and/or weighing device to determine characteristics of the item independently. In some embodiments, characteristics are obtained from multiple sources (e.g., stored record, captured from label, and/or independently measured).

After the characteristics are acquired, the controller 140 determines where to deposit the item in the vehicle at Block 940. In various embodiments, the cargo area 410 within the vehicle 400 may be configured to store items of particular sizes/weights in particular locations. For example, some vehicles 400 may be configured with multiple storage locations to accommodate items of a predetermined threshold sizes (e.g., one or more dividers for each shelf, separate conveyors, and the like to separate items). For example, a vehicle may comprise storage locations configured to store small, medium, large items where each category of item size has an associated size threshold. In some embodiments, the cargo area 410 may include an area to accommodate irregular items that would not fit within the threshold sizes.

In various embodiments, the controller 140 compares the acquired characteristics against the threshold parameters for storage locations to determine which storage locations could accommodate the item at Block 940. The controller 140 also identifies storage locations having capacity to receive the item. In various embodiments, the controller 140 monitors where items are placed (and removed from) and can therefore identify which storage locations are available. In some embodiments, the storage locations themselves have monitoring devices to indicate whether an item is present (e.g., proximity switches, light curtains, and the like). This information may be communicated back to the controller 140.

In some embodiments, a bin or shelf may be reserved for pickups and/or unsuccessfully delivered items. In this case, the controller 140 may recognize that the item is a pickup or unsuccessfully delivered item based on a variety of data. For example, the controller 140 may make the determination based on the location of the vehicle (e.g., the vehicle is on route), input from the driver via the associated mobile computing entity and/or data associated with the unique identifier. In these cases, picked up items are automatically assigned to the one or more bins reserved for pickups and/or unsuccessfully delivered items. In some cases, the reserved bins/shelves may accommodate multiple items.

After an available storage location is identified for the item, the controller 140 sends an instruction to the automated load/unload device 460 to position the item onto the appropriate storage location. For example, the controller 140 may send a signal to the automated load/unload device 460 to move to the appropriate location (i.e. fore/aft to the appropriate location and up/down relative to the appropriate shelf) and deposit the item onto the appropriate storage location. In some embodiments, the controller 140 will also send a signal to the appropriate shelf to initiate movement of the associated power rollers/conveyors to receive the item (e.g., urge the item into the storage location) and bias the item against the associated side wall of the vehicle. In various embodiments, the controller 140 stores the location of the item in memory for later retrieval when the item is to be removed from the vehicle. After positioning the item onto the appropriate location, the robot may return to a home position, ready to position an additional item.

E. Rearranging Items within the Delivery Vehicle while on Route

In various embodiments, the items within the delivery vehicle 400 may be rearranged as some items are delivered such that the storage locations are used more efficiently. For example, the automated load/unload device 460 may reposition the items to storage locations closer to the access port to provide faster retrieval of items. In some embodiments, items may be repositioned into storage locations that better fit the actual characteristics of an item.

FIG. 11 illustrates steps that may be performed to rearrange items within the vehicle 400 according to various embodiments of the invention. The exemplary process starts at Block 1000 when the repositioning process is initiated. In various embodiments, the repositioning may occur during predetermined time periods. In some embodiments, the repositioning occurs during scheduled breaks such as lunch breaks. The initiation of a lunch break may be determined based on input from the driver into an associated mobile computing entity 105 which communicates the status to the controller 140. In other embodiments, the controller 140 may initiate repositioning of items while the vehicle is between delivery stops. For example, the controller 140 may be programmed to initiate repositioning of items between predetermined stops based on an estimated travel time between stops provided in the dispatch plan. For example, if the estimated travel time between stops exceeds a predetermined threshold (e.g., 5 minutes, 10 minutes, etc.), the controller 140 may initiate repositioning of one or more items.

In various embodiments, the controller 140 compares the acquired characteristics for items still in the cargo area 410 against the threshold parameters for vacant storage locations at Block 1010. At Block 1020, the controller 140 identifies which items may be repositioned to a storage location having capacity to receive the item. In various embodiments, the controller 140 identifies items that could be placed in smaller storage locations based on the stored characteristics and the threshold sizes for storage locations. In some embodiments, the items may be moved closer to the access port 415 for faster retrieval. If a storage location has become free due to delivery of an item and an item could be more efficiently stored in that location, the controller 140 may send a repositioning instruction to the automated load/unload device 460 to retrieve and reposition the item into the new location. For example, a small item may be stored in a medium location because all of the small locations were taken when the item was initially loaded. Once a small location becomes available, the controller 140 may instruct the automated load/unload device 460 to move the small item to the vacant small location. This would vacate a medium location to receive a pickup item if necessary.

After an available storage location is identified for the item, the controller 140 sends an instruction to the automated load/unload device 460 to position the item onto the appropriate storage location at Block 1030. For example, the controller 140 may send instructions to the automated load/unload device 460 to move to a position proximate the appropriate storage location (i.e. fore/aft to the appropriate location and up/down relative to the appropriate location) and retrieve the item from the shelf. In some embodiments, the controller 140 will also sends a signal to the appropriate storage location to initiate movement of the associated power rollers/conveyors to move the item towards and onto the automated load/unload device 460 (e.g. onto a platform of the automated load/unload device). The controller 460 may also send instructions to the automated load/unload device 460 to initiate powered rollers/conveyor as well to receive the item. The automated load/unload device 460. In other embodiments, the automated load/unload device 460 grasps the item from the shelf without the associated shelf being activated.

After the item is obtained by the automated load/unload device 460, the automated load/unload device may move to the new storage location (i.e. fore/aft to the appropriate location and up/down relative to the appropriate location) and deposit the item onto the new storage location. In some embodiments, the controller will also send a signal to the appropriate storage location to initiate movement of the associated power rollers/conveyors to receive the item and bias the item against the associated side wall of the vehicle. In various embodiments, the controller stores the location of the item in memory for later retrieval when the item is to be delivered. After positioning the item onto the appropriate location, the automated load/unload device 460 may return to a home position, ready to position an additional item.

IV. Conclusion

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

As should be appreciated, various aspects of different embodiments may be implemented in various ways, including as methods, apparatus, systems, or computer program products. Accordingly, various aspects may take the form of an entirely hardware embodiment or an embodiment in which a processor is programmed to perform certain steps. Furthermore, various aspect implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

It should be emphasized that the above-described embodiments of the present invention, particularly any "preferred embodiments" or "exemplary embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

In concluding the detailed description, it should be noted that it will be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

The invention claimed is:

1. A method for retrieving items from a vehicle comprising the steps of:
    storing, in a memory, data indicative of a storage location of each of one or more items, wherein the storage locations are assigned locations at which each of the one or more items are placed within a vehicle;
    identifying the one or more items to be retrieved;
    retrieving data indicative of the storage location of each of the one or more items from the memory;
    detecting, via a location-determining device, a position of the vehicle with respect to a delivery location;
    determining whether the detected position of the vehicle is within a threshold distance of the delivery location;
    in response to determining that the detected position of the vehicle is within the threshold distance of the delivery location, actuating a load/unload device to retrieve each of the one or more items from the storage location; and
    transporting, via the load/unload device, the one or more items to an access port for retrieval from the vehicle.

2. The method of claim 1, further comprising detecting that the vehicle is stopped, and wherein the load/unload device is actuated in response to: (1) detecting that the vehicle is stopped, and (2) determining that the detected position of the vehicle is within the threshold distance of the delivery location.

3. The method of claim 1, wherein identifying the one or more items to be retrieved is based at least in part on the detected position of the vehicle with respect to the delivery location.

4. The method of claim 1, wherein identifying the one or more items to be retrieved is based on a sequence of delivery identified in a predetermined dispatch plan.

5. The method of claim 1 further comprising determining one or more characteristics of the one or more items, and wherein the storage location of the one or more items is based at least in part on the determined characteristics.

6. The method of claim 1, wherein the one or more items comprises a plurality of items, and the step of transporting the one or more items to the access port comprises transporting the plurality items to the access port such that the plurality of items are available for retrieval from the vehicle simultaneously.

7. The method of claim 1, further comprising providing a delivery service according to a dispatch plan, wherein said dispatch plan comprises a plurality of delivery stops each corresponding to a delivery location associated with one or more items of a plurality of items, and wherein the step of identifying the one or more items to be retrieved is based at least in part on the delivery location corresponding to an upcoming delivery stop.

8. The method of claim 1, wherein the load/unload device comprises a selectively rotatable platform having one or more power rollers, and wherein actuating the load/unload device comprises moving a lifting mechanism to adjust the relative height of the selectively rotatable platform to gain access to the storage location.

9. A system for retrieving items from a vehicle comprising:
a vehicle having a cargo area with an access port and a plurality of storage locations, wherein each of said plurality of storage locations are configured for storing one or more items;
a load/unload device configured to transport the one or more items from one of the plurality of storage locations to the access port for retrieval from the vehicle;
a vehicle location-determining device configured to detect a position of the vehicle; and
a controller communicatively coupled to the vehicle location determining device and the load/unload device, the controller comprising at least one processor and at least one memory having program code instructions embodied therein, the at least one memory and program code instructions being configured to, with the at least one processor, cause the controller to:
store, in the at least one memory, data indicative of a storage location of each of the one or more items, wherein the storage locations are assigned locations at which each of the one or more items are placed within the vehicle;
receive input indicative of the one or more items to be retrieved;
retrieve data indicative of the storage location of each of the one or more items from the at least one memory;
receive, from the vehicle location-determining device, a detected position of the vehicle with respect to a delivery location;
determine whether the detected position of the vehicle is within a threshold distance of the delivery location; and
in response to determining that the detected position of the vehicle is within the threshold distance of the delivery location, provide instructions to the load/unload device to retrieve the one or more items from the storage location of each of the one or more items.

10. The system of claim 9, further comprising a telematics device communicatively coupled to the controller and configured to detect conditions indicative of the vehicle being stopped.

11. The system of claim 10, wherein the controller is further configured to receive data from the telematics device, and wherein the instructions are provided to the load/unload device in response to the controller receiving data: (1) from the telematics device indicating that the vehicle is stopped, and (2) that the detected position of the vehicle is within the threshold distance of the delivery location.

12. The system of claim 9, wherein the controller is further configured to identify the one or more items to be retrieved based at least in part on the detected position of the vehicle with respect to the delivery location.

13. The system of claim 9, wherein the load/unload device comprises a selectively rotatable platform having one or more power rollers and a lifting mechanism configured to adjust the relative height of the selectively rotatable platform to gain access to one or more of the plurality of storage locations.

14. The system of claim 13, wherein the lifting mechanism is operatively attached to the selectively rotatable platform and a base, wherein the base is configured to move axially within the vehicle.

15. The system of claim 14, wherein the base engages one or more rails in the vehicle to facilitate movement of the base within the vehicle.

16. The system of claim 9, further comprising a characteristic determining device communicatively coupled to the controller and configured to determine at least one physical characteristic of the one or more items, and wherein the controller is further configured to determine the storage location of each of the one or more items based at least in part on the determined at least one physical characteristic of each of the one or more items.

17. The system of claim 16, wherein the determined characteristic is at least one of a dimension of the item or a weight of the item.

18. The system of claim 9, wherein:
the at least one memory has a dispatch plan stored therein, the dispatch plan comprising a plurality of delivery stops each corresponding to a delivery location associated with the one or more items; and
the controller is further configured to identify the one or more items to be retrieved based at least in part on the dispatch plan.

19. The system of claim 9, wherein the input indicative of one or more items to be retrieved comprises input to a mobile computing entity identifying one or more items to be retrieved.

20. The system of claim 19, wherein:
the at least one memory has a dispatch plan stored therein, the dispatch plan comprises a plurality of delivery stops each corresponding to a delivery location associated with the one or more items; and
the controller is further configured to identify the one or more items to be retrieved based at least in part on the dispatch plan.

* * * * *